United States Patent [19]

Takano

[11] Patent Number: 5,369,768
[45] Date of Patent: Nov. 29, 1994

[54] CONTROL DEVICE FOR ELECTRONIC EQUIPMENT HAVING OPERATING MEANS AND A DISPLAY DEVICE

[75] Inventor: Yoshiaki Takano, Toyokawa, Japan

[73] Assignee: Minolta Camera Kabushiki Kaisha, Osaka, Japan

[21] Appl. No.: 793,117

[22] Filed: Nov. 18, 1991

[30] Foreign Application Priority Data

Nov. 22, 1990 [JP] Japan .................. 2-319175

[51] Int. Cl.$^5$ .................................................. G06F 9/46
[52] U.S. Cl. ............................. 395/725; 364/941.1; 364/941.3; 364/942.5; 364/DIG. 2
[58] Field of Search .............. 395/725, 325, 650, 200; 364/941.1, 941.3, 942.5, DIG. 2, 138; 355/206

[56] References Cited

U.S. PATENT DOCUMENTS

| | | | |
|---|---|---|---|
| 3,648,252 | 3/1972 | Thron et al. | 395/650 |
| 3,876,664 | 10/1989 | Bittorf et al. | 395/200 |
| 3,905,025 | 9/1975 | Davis et al. | 364/200 |
| 4,062,061 | 12/1977 | Batchelor et al. | 395/575 |
| 4,183,089 | 1/1980 | Daughton et al. | 395/275 |
| 4,188,668 | 2/1980 | Finlay | 364/900 |
| 4,343,036 | 8/1982 | Shimizu et al. | 364/518 |
| 4,484,302 | 11/1984 | Cason et al. | 395/158 |
| 4,638,452 | 1/1987 | Schultz et al. | 395/550 |
| 4,747,071 | 5/1988 | Sato | 395/200 |
| 4,755,996 | 7/1988 | Masuda | 371/16.4 |
| 4,794,386 | 12/1988 | Bedrij et al. | 340/724 |
| 5,142,624 | 8/1992 | Patrick, II | 395/200 |
| 5,163,137 | 11/1992 | Yamamoto et al. | 395/325 |
| 5,191,648 | 3/1993 | Ikenoue et al. | 395/200 |

Primary Examiner—Allen R. MacDonald
Assistant Examiner—Glenn A. Auve
Attorney, Agent, or Firm—Burns, Doane, Swecker & Mathis

[57] ABSTRACT

A control device for controlling specified system devices, a display control process for controlling a dynamic lighting display device, and a communication control process for controlling communication between other control devices. This control device is provided a memory means for temporarily storing data received from the other control devices, and a single control means for executing the system control process by the main routine as well as executing the display control process and communication control process by interrupt routines. The control means gives the display control process priority over the communication control process in the interrupt routines.

13 Claims, 12 Drawing Sheets

CONTROL DEVICE FOR ELECTRONIC EQUIPMENT HAVING OPERATING MEANS AND A DISPLAY DEVICE

BACKGROUND OF THE INVENTION

1. Field of the Invention

The present invention relates to an electronic device with display device, and more specifically relates to an electronic device for executing a plurality of programs via a single processor.

2. Description of Related Art

Conventional image forming apparatus such as, for example, copying machines and the like, use a plurality of control devices, e.g., microprocessing units (MPU) and the like which process at high speed and in parallel a plurality of control processes such as control processing for the mechanical portion of image formation, control processing for the optical unit for image formation, input control processing for each key and display control processing for the display portion, as well as control processing for the automatic document feeder (hereinafter referred to as "ADF") and the like. The aforesaid control devices further execute processing for cooperative execution of each of the aforesaid control processes via communication lines between the various aforesaid control devices.

However, the use of multiple control devices makes the entire control system become more complex, thereby requiring more complex software for operation. The aforesaid disadvantages increase the production costs for the system.

A further disadvantage occurs when a dynamic lighting type display device is used, inasmuch as the periodicity of the lighting of the display device cannot be uniformly maintained.

A still further disadvantage obtains when receiving data from other control devices while other control processes such as the display control process and the like are executing, inasmuch as the data from said other control devices cannot be received.

U.S. Pat. No. 4,343,036 discloses a copying machine having a special microcomputer to accomplish dynamic lighting of the display device. This arrangement has the disadvantage of increasing the cost of the apparatus due to the use of the aforesaid special microcomputer.

SUMMARY OF THE INVENTION

A main object of the present invention is to provide a control device that eliminates the previously described disadvantages.

Another object of the present invention is to provide a control device for controlling the display device and other moving means via a single processor.

A further object of the present invention is to provide a control device for controlling the display device and other moving means via a single processor while said processor is communicating with other processors.

A still further object of the present invention is to provide a control device for dynamic lighting of a display means via an interrupt process.

An even further object of the present invention is to provide a control device for prioritizing the interrupt process for dynamic lighting of a display means via an interrupt process such that said dynamic display interrupt process supersedes other interrupt processes.

DESCRIPTION OF THE PREFERRED EMBODIMENTS

Figure 1:
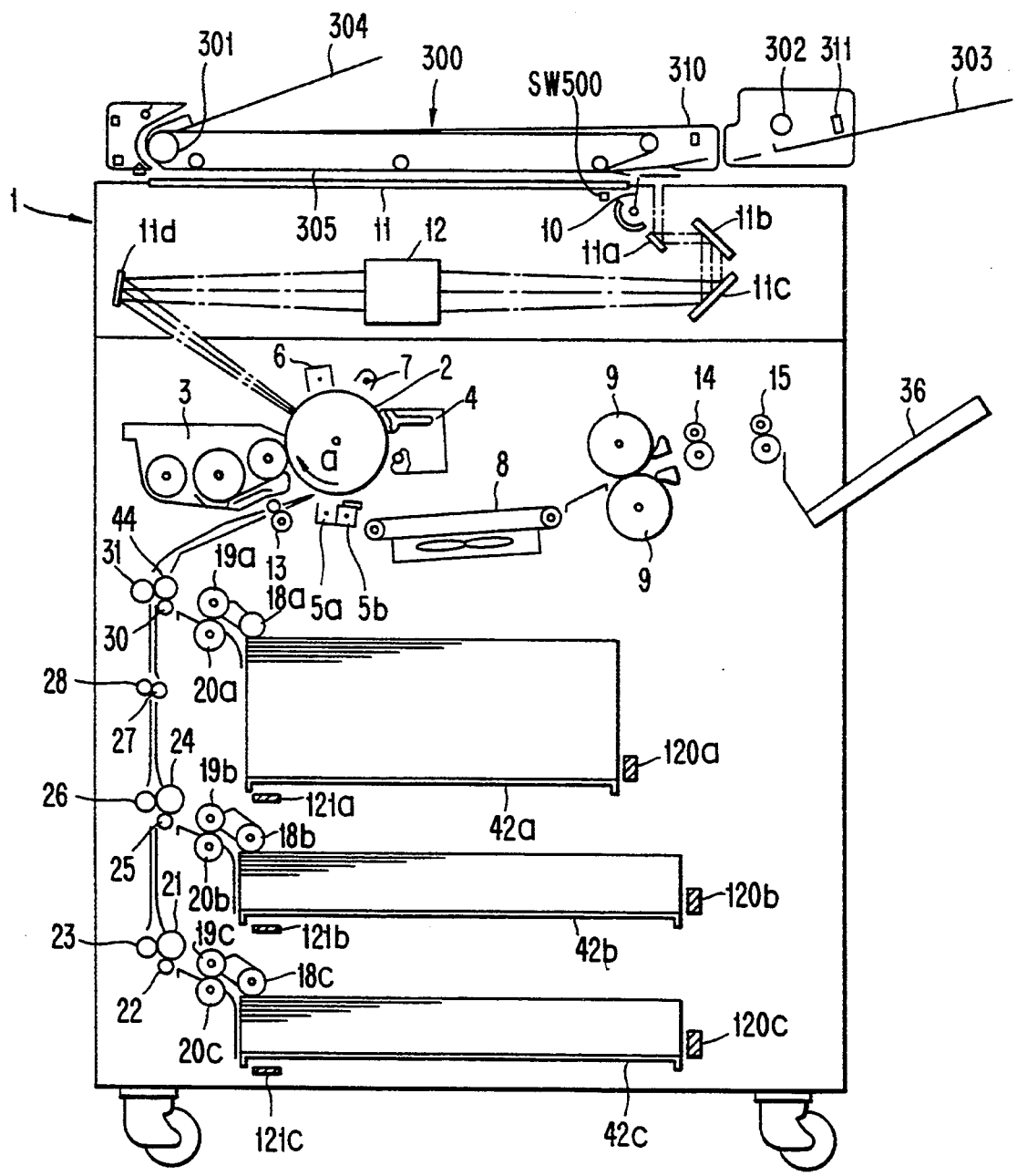
FIG. 1 is a section view of a copying machine.

The first embodiment of the present invention relative to an electrophotographic copying machine is described hereinafter with reference to the accompanying drawings and in the following sequence.

a) Construction of the copying machine
b) Operation panel
c) Construction of the control portion
d) Operation of the copying machine The copying machine of the present embodiment has three operating modes comprising an automatic paper selection mode (hereinafter referred to as "APS mode") for automatically selecting one of the paper cassettes 42a, 42b and 42c in accordance with the size of the original document disposed on the glass document platen 11 or the document tray 303 of the ADF 300, automatic magnification selection mode (hereinafter referred to as "AMS mode") for automatically selecting the copy magnification in accordance with the size of the original document disposed on the glass document platen 11 or the document tray 303 of the ADF 300 and the size of the selected paper cassette, and a manual mode to allow the operator to select the paper cassette and the copy magnification via a manual operation. The copying machine of the present embodiment further has three condition modes comprising a trouble mode for trouble conditions arising from abnormal operation such as a nonfunctioning lamp of light source 10, improper heating of the fixing device 9 and the like, jam mode for paper jam conditions, and a normal mode for the normal operating condition in the absence of trouble or paper jams.

Figure 10:
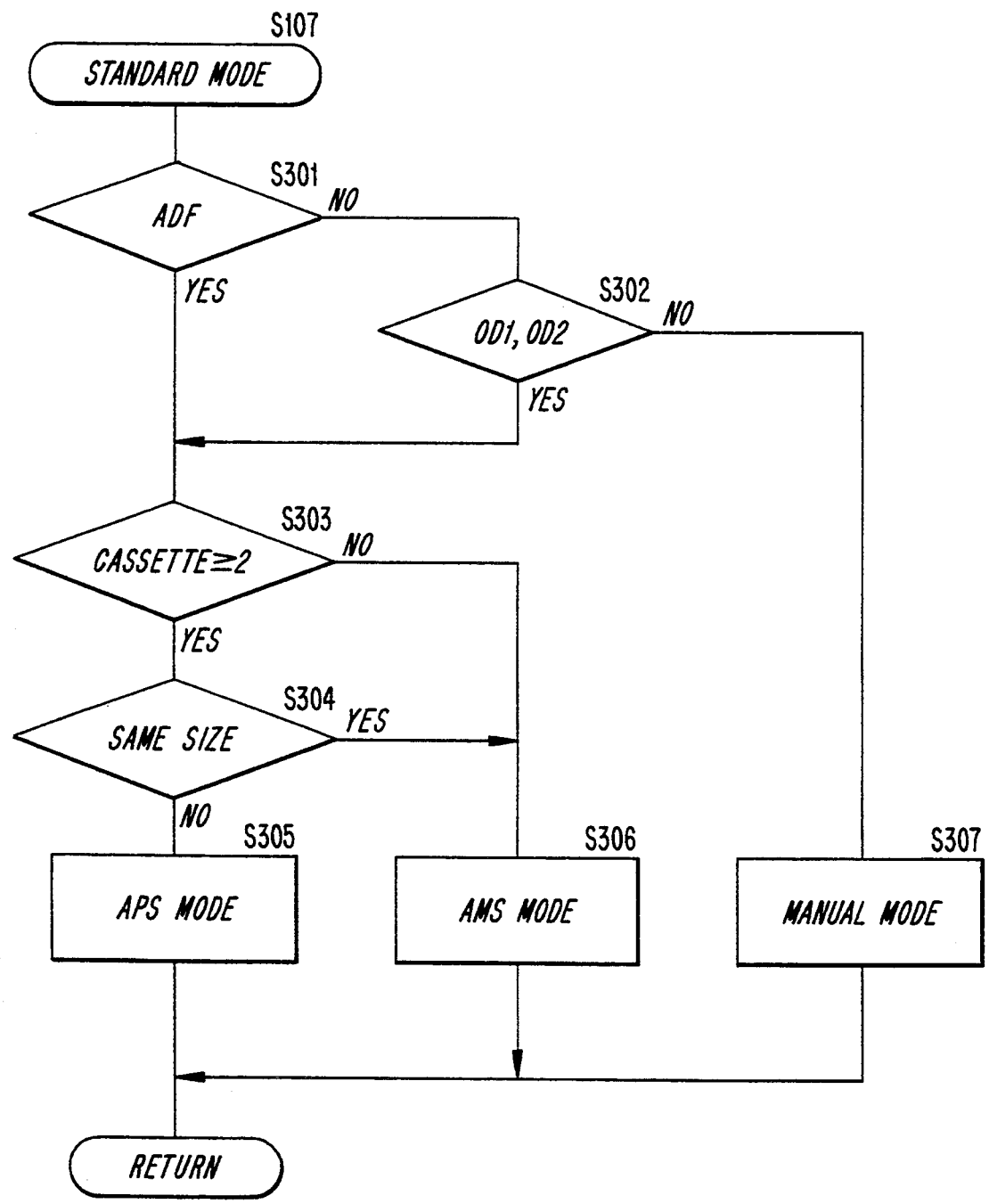
FIG. 10 is a flow chart showing the standard mode setting process subroutine of FIG. 9.

The copying machine of the present embodiment may be provided optional equipment with additional functions such as the ADF 300, document size detecting device for detecting the size of original documents disposed immediately below the glass document platen 11 of the copying machine main unit 1 or the ADF 300, and an optional quantity of paper cassettes 42a, 42b and 42c. When the main switch MSW of the aforesaid copying machine is turned ON and the standard mode set key 215 is also turned ON, the standard mode setting process is executed as shown in FIG. 10. That is, in the standard mode setting process shown in FIG. 10, when the ADF 300 is installed or the document size detecting device is installed (S301, YES), two or more paper cassettes are installed (S303, YES), and said paper cassettes accommodate paper of dissimilar sizes (S304, YES), the previously mentioned APS mode is automatically set as the standard mode (S305). When the ADF 300 is installed (S301, YES) or the document size detecting device is installed (S302, YES), either two or more paper cassettes are not installed (S303, NO) or two or more paper cassettes are installed (S303, YES) and said cassettes accommodate the same size paper therein (S304, YES), the previously described AMS mode is automatically set as the standard mode (S306). When the ADF 300 is not installed (S301, NO), i.e., when document size detecting device is not installed (S302, NO), the manual mode is automatically set as the standard mode (S307).

The copying machine of the present embodiment provides a system control MPU 100 for controlling all systems of the copying machine 1 main unit excluding the optical unit, optical unit control MPU 400 for controlling the optical unit system connected to the aforesaid MPU 100, and ADF MPU 320 for controlling the ADF 300. The MPU 100 executes the image forming process of the copying machine main unit 1 in the main routine shown in FIG. 4, as well as executes the input process of the key matrix 201 of operation panel 200 and the display process for the display matrix 202 that executes the dynamic lighting thereof, and the communication process for optical unit control MPU 400 and the communication process for ADF control MPU 320 as shown in the interrupt process described in FIGS. 6 through 8. That is, the MPU 100 executes the aforesaid plurality of processes in simulated parallel processing by executing the non-image forming processes via a multiple interrupt process. The multiple interrupt process comprises a process for prioritizing the display processing to maintain constant periodicity for lighting the display matrix 202, and provides a receiving buffer memory 107 and a data buffer memory 108 to store the data received from the optical unit MPU 400 and the ADF control MPU 320 during the aforesaid display processing.

(a) Construction of the copying machine

FIG. 1 is a section view showing the construction of an embodiment of the electrophotographic copying machine of the present invention.

As shown in FIG. 1, the copying machine comprises a main unit 1, and the optional ADF 300; three optional paper cassettes 42a, 42b and 42c are also installed in the copying machine. Further options provided are the original document size detecting devices OD1 and OD2 disposed immediately below the ADF 300 and the glass document platen 11. The original document size detecting devices OD1 and OD2 detect the size of the placed original document, and output document size detection signals to the central processing unit (hereinafter referred to as "CPU") 101 in the system control MPU 100 of the control portion shown in FIG. 4 and described in detail later.

A photosensitive drum 2 is provided centrally in the copying machine 1 and is rotatably driven in the counterclockwise direction. Disposed peripherally around the photosensitive drum 2 are, sequentially in the counterclockwise direction, eraser lamp 7, charger 6, developing device 3, transfer charger 5a, separation charger 5b to separate the transfer sheet from the photosensitive drum 2, and blade type cleaning device 4. The surface of the photosensitive drum 2 is provided a photosensitive member of, for example, selenium and the like, which for each copy is optically exposed by the eraser lamp 7, charged by the charger 6, then subjected to image exposure from the optical unit described later.

The optical unit is provided directly below the glass document platen 11 and comprises a first mirror 11a, second mirror 11b, third mirror 11c, projection lens 12, and fourth mirror 11d. The image of the document placed on the document platen 11 is formed on the surface of the photosensitive drum 2 through the mirrors 11a, 11b, 11c, projection lens 12 and mirror 11d, as indicated by the broken lines in FIG. 2. The position switch SW 500 is provided to detect whether or not the optical unit is set at a predetermined position for scanning. Relative to the rotation of the photosensitive drum 2 during, for example, an equal magnification copy operation, the light source 10 and first mirror 11a are moved leftward at a speed equal to the circumferential speed of the photosensitive drum 2, while at the same time the second mirror 11b and the third mirror 11c move leftward in FIG. 1 at ½ the circumferential speed of the photosensitive drum 2. The image of the original document is projected from the fourth mirror 11d through a slit and onto the surface of the photosensitive drum 2 in accordance with the aforesaid movement of the various mirrors.

As previously mentioned, the copying machine 1 is optionally provided with a maximum of three paper cassettes, i.e., top cassette 42a, middle cassette 42b and bottom cassette 42c. During the copying operation, after a copy sheet has been transported from the cassettes 42a, 42b or 42c into position at the timing roller 13, said timing roller 13 advances the copy sheet to the transfer portion. That is, the copy sheets accommodated in the top cassette 42a are picked up one sheet at a time by the pickup roller 18a, and transported to the aforementioned position of the timing roller 13 via feed rollers 19a and 230a and transport rollers 30, 31 and 44. The copy sheets accommodated in the middle cassette 42b are picked up one at a time by the pickup roller 18b, and transported to the aforesaid position of the timing roller 13 via feed rollers 19b and 20b, and transport rollers 24, 25, 26, 27, 28, 31 and 44. The copy sheets accommodated in the bottom cassette 42c are picked up one sheet at a time by the pickup roller 18c, and transported to the aforesaid position of the timing roller 13 via the feed rollers 19c and 20c, and transport rollers 21, 22, 23, 24, 26, 27, 28, 31 and 44.

The copy sheet transported to the transfer portion adheres to the surface of the photosensitive drum 2, and the toner image is transferred to the copy sheet via a corona discharge by the transfer charger 5a. Then, the copy sheet is separated from the photosensitive drum 2 via a corona discharge by the separation charger 5b and the stiffness of the copy sheet itself. The copy sheet is suctioned onto the transport belt 8 which has an air suction means; the copy sheet is transported to the right in FIG. 1 in conjunction with the clockwise rotation of the belt 8. Thereafter, the copy sheet passes the fixing unit 9 which fuses the toner image onto the copy sheet. Then, the copy sheet is discharged to the discharge tray 36 by the discharge rollers 14 and 15.

Three cassette detecting switches 120a, 120b and 120c are provided near the three cassettes 42a, 42b and 42c, respectively. The switches 120a, 120b and 120c output cassette detection signals PCMS1, PCMS2 and PCMS3 indicating whether or not the respective paper cassettes 42a, 42b and 42c are installed, said cassette detection signals being output as interrupt request signals to the CPU 101 in the system control MPU 100. The cassette detection signal data input to the CPU 101 are stored in the RAM 103.

Three paper size detection switches 121a, 121b and 121c are provided near the sheet feed openings of the aforesaid three cassettes 42a, 42b and 42c, respectively, and comprising four microswitches SW1, SW2, SW3 and SW4. Each of the paper size detecting switches 121a, 121b and 121c detect the size of the copy sheets accommodated in each of the cassettes 42a, 42b and 42c, as well as whether or not said sheets are disposed lengthwise or widthwise relative to the sheet transport direction. In the present embodiment, the sizes of the usable copy sheets, i.e., the sizes of the copy sheets accommodatable in the cassettes 42a, 42b and 42c, are A3, A4, A5, B4 and B5. Both the A4 and B5 size copy sheets can be selectably oriented in the lengthwise and widthwise directions. The copy sheet size and placement direction are detectable via 4-bit codes corresponding to the ON/OFF combinations of the four switches SW1, SW2, SW3 and SW4 of switches 121a, 121b and 121c, as shown in Table 1. Each of the switches 121a, 121b and 121c outputs the paper size detection signals PCSS1, PCSS2 and PCSS3 in the form of the aforesaid 4-bit codes which are input to the CPU 101 as interrupt request signals when said codes are changed. The paper size signal data input to the CPU 101 are stored in the RAM 103. In Table 1, the ON state of each of the switches SW1, SW2, SW3 and SW4 is expressed as [1], and the OFF state of said switches is expressed as [0]. If all the switches SW1, SW2, SW3 and SW4 are in the OFF state, the condition wherein no copy sheets are accommodated in the paper trays is indicated.

| Binary Code | | | | Sheet size | |
| SW1 | SW2 | SW3 | SW4 | Placement | Decimal Code |
| --- | --- | --- | --- | --- | --- |
| 0 | 0 | 0 | 0 | | 0 |
| 0 | 0 | 0 | 1 | | 1 |
| 0 | 0 | 1 | 0 | | 2 |
| 0 | 0 | 1 | 1 | A5 Length | 3 |
| 0 | 1 | 0 | 0 | B5 Length | 4 |
| 0 | 1 | 0 | 1 | A4 Length | 5 |
| 0 | 1 | 1 | 0 | B4 Length | 6 |
| 0 | 1 | 1 | 1 | A3 Length | 7 |
| 1 | 0 | 0 | 0 | | 8 |
| 1 | 0 | 0 | 1 | | 9 |
| 1 | 0 | 1 | 0 | B5 Width | 10 |
| 1 | 0 | 1 | 1 | A4 Width | 11 |
| 1 | 1 | 0 | 0 | | 12 |
| 1 | 1 | 0 | 1 | | 13 |
| 1 | 1 | 1 | 0 | | 14 |
| 1 | 1 | 1 | 1 | | 15 |

In the ADF 300, the document feed sensor 310 detects whether or not an original document has been fed, and the document detecting sensor 311 detects whether or not an original document has been placed on the document tray 303. The transport belt motor 301 rotates the document transport belt 305 of the ADF 300 in the clockwise direction, and the document feed motor 302 feeds the document from the document tray 303 to a predetermined position on the document platen 11. After the document image is read, the document is discharged to the discharge tray 304.

(b) Operation Panel

Figure 2:
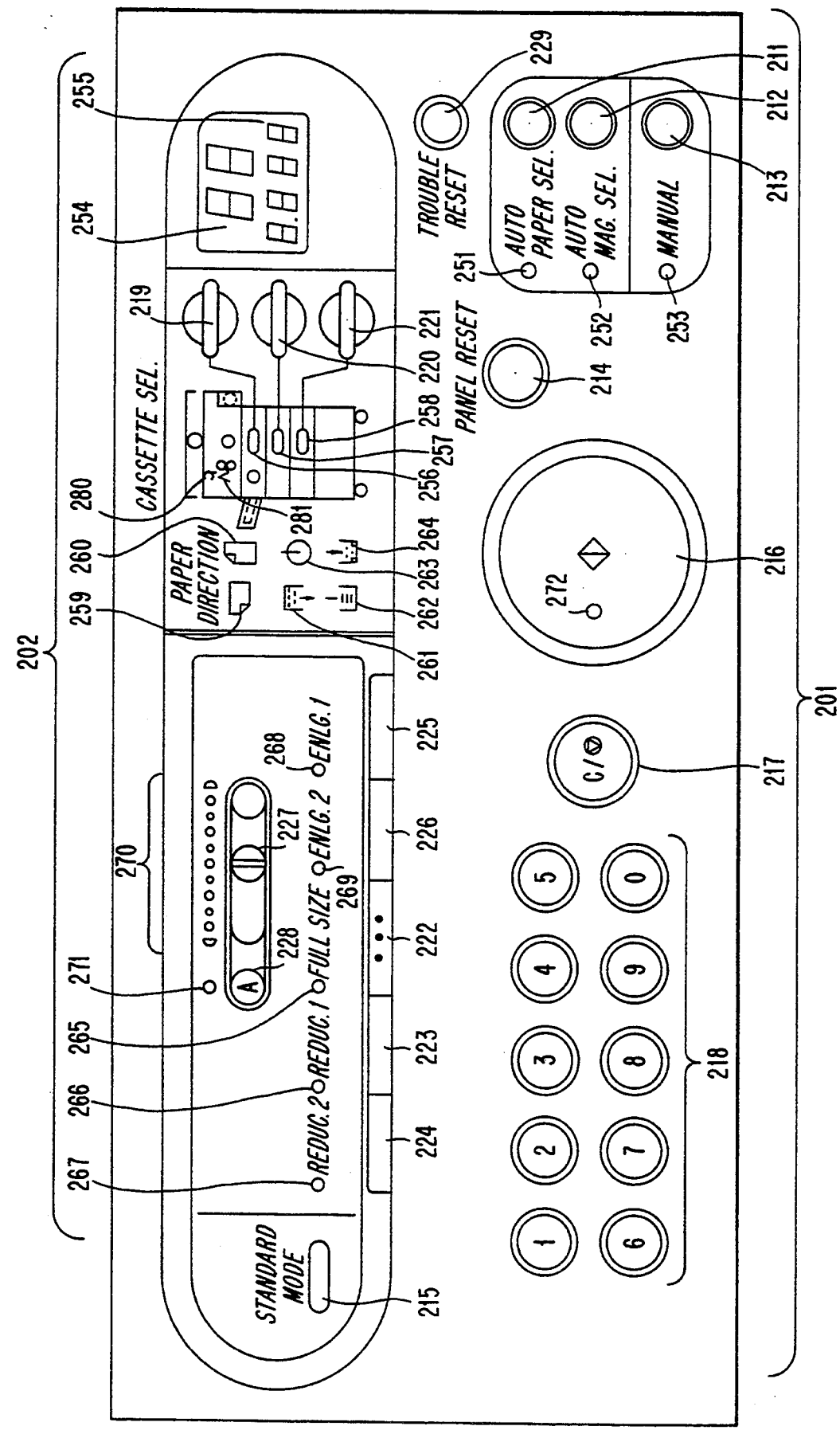
FIG. 2 is a section view of the operation panel of the copying machine.

FIG. 2 is a front view of the operation panel 200 provided on the copying machine main unit 1, and comprises a key matrix 201 and a display portion 202 which is lighted by a dynamic lighting method.

As shown in FIG. 2, the key matrix 201 comprises APS mode set key 211 for setting the APS mode, AMS mode set key 212 for setting the AMS mode, manual mode key 213 for setting the previously described manual mode, and initialization key (panel reset key) 214 for setting predetermined values for all copy settings (for example, single copy, magnification, cassette 42a, manual mode) which are specifiable by the operation panel 200. The key matrix 201 is also provided with a standard mode key 215 for specifying the executing of the standard mode set process which sets the optimum mode among the APS, AMS and manual modes as the operating mode of the copying machine 1 in conjunction with whether or not the optional ADF 300 is installed, whether or not the document size detecting device is installed in the ADF 300 or the copying machine main unit 1, whether or not the two or more paper cassettes are installed, and whether or not all cassettes accommodate the same size sheets when two or more cassettes are installed.

The key matrix 201 comprises a copy start key 216 for starting the copy operation, clear/stop key 217 for clearing the set copy number by setting the value [1] as the copy number and stopping the copy operation during an on-going copy operation, ten-key pad 218 for setting the copy number, paper cassette selecting key 219, 220 and 221 for selecting one cassette from among the three cassettes 42a, 42b and 42c, and five copy magnification set keys 222 through 226 for setting the copy magnification. The magnification set key 222 is the equal magnification selection key for setting equal copy magnification; key 223 is a reduction selection key for setting a predetermined first reduced magnification; key 224 is a reduction selection key for setting a predetermined second reduced magnification; key 225 is an enlargement selection key for setting a predetermined first enlarged magnification; key 226 is an enlargement selection key for setting a predetermined second enlarged magnification. The key matrix 201 further comprises a density regulating key 227 for adjusting copy density, automatic density regulating key 228 for automatically executing density adjustment in accordance with the print letters, characters or images of the original document, and a trouble reset key 229 for resetting the trouble mode that is triggered when trouble malfunction occurs in the copying machine 1.

The display matrix 202 comprises a light-emitting diode (hereinafter referred to as "LED") 251 for indicating when the APS mode is set, LED 252 for indicating when the AMS mode is set, LED 253 for indicating when the manual mode is set, 7-segment LED display 254 for indicating the set copy number, 7-segment LED display 255 for indicating the set copy magnification and abnormal condition codes when the trouble mode or jam mode is executed, LED 256 for indicating when the top cassette 42a is selected, LED 257 for indicating when the middle cassette 42b is selected, LED 258 for indicating when the bottom cassette 42c is selected, LEDs 259 and 260 for indicating the document placement direction, and LEDs 280 and 281 for indicating the various abnormal conditions of the trouble mode. The display matrix 202 further comprises an LED 261 for indicating when waste toner is at maximum capacity, LED 262 for indicating the paper empty condition, LED 263 for indicating the on-going warmup condition, and LED 264 for indicating the toner empty condition.

The display matrix 202 further provides an LED 265 for indicating when equal copy magnification has been selected, LED 266 for indicating when the first magnification reduction has been selected, LED 267 for indicating when the second magnification reduction has been selected, LED 268 for indicating when the first magnification enlargement has been selected, LED 269 for indicating when the second magnification enlargement has been selected, LED 270 for indicating the set density, and LED 271 for indicating when the aforesaid automatic density regulation has been set.

(c) Construction of the Control Portion

Figure 3:
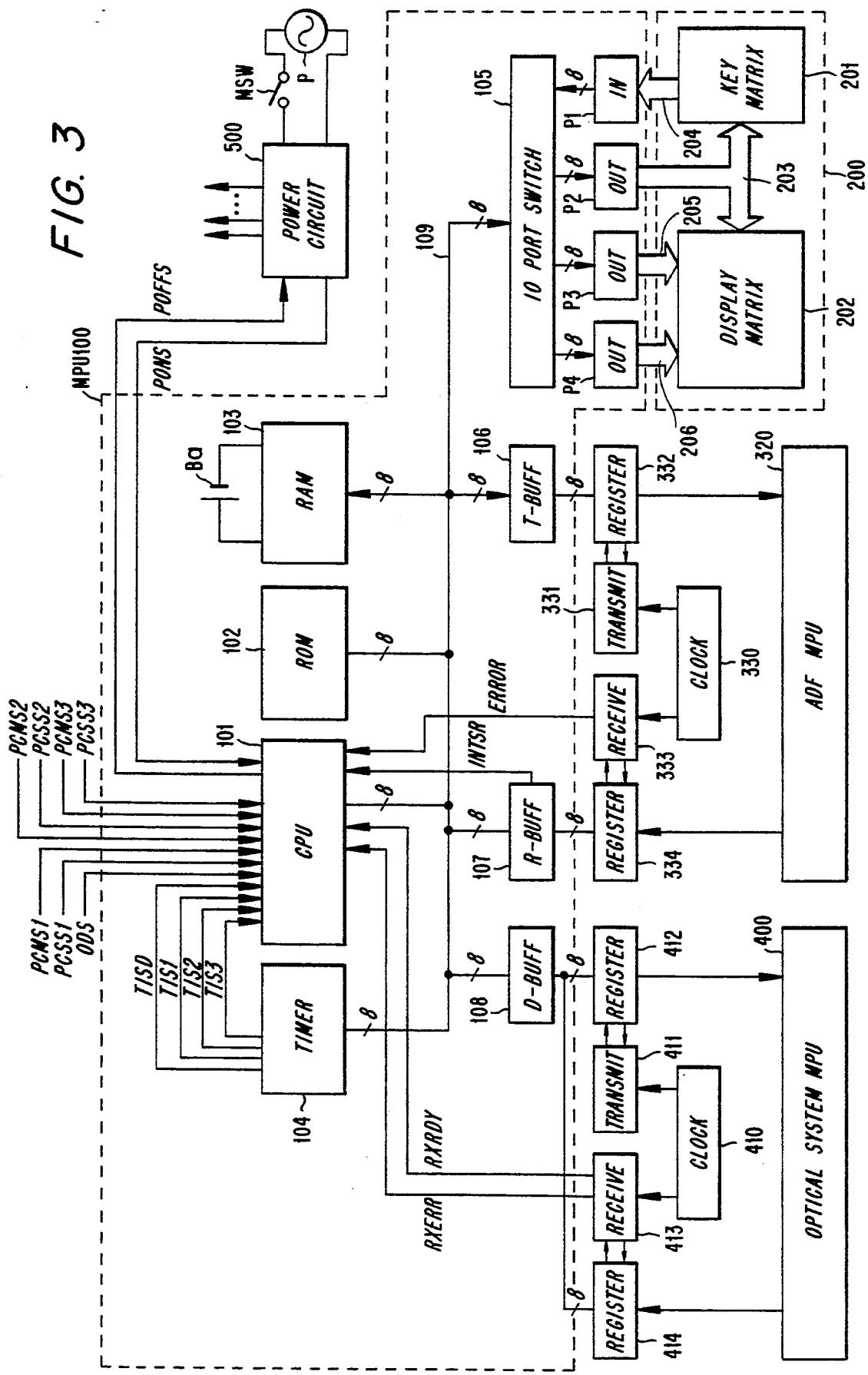
FIG. 3 is a plane diagram of the operation panel and the control portion of the copying machine.

FIG. 3 is a block diagram showing the construction of the present embodiment of the control portion of the copying machine 1. The control portion comprises a system control MPU 100 for controlling all systems of the copying machine excluding the optical unit, and further comprises ADF control MPU 320 for controlling the ADF 300, optical unit control MPU 400 for controlling the optical system such as the scanner, lenses, mirrors and the like. The aforesaid MPU 100 is electrically connected to the operation panel 200, ADF control MPU 320 and optical unit control MPU 400, the details of said connections being described later.

The power circuit 500 is connected to an alternating current (AC) power source PS through the main switch MSW, such that when the main switch MSW is turned ON a predetermined direct current (DC) voltage is supplied to all circuits of the system control MPU 100, and a power ON signal PONS is transmitted to the CPU 101 and said CPU 101 is reset. Then, when the CPU 101 executes the copy settings initialization process (FIG. 9), the main relay (not shown in the drawing) is turned ON in the power circuit 500; at this time predetermined DC voltages or AC voltages are supplied to the various circuits and components outside the MPU 100. On the other hand, when a power OFF signal POFFS is output from the CPU 101 to the power circuit 500, the main relay is turned OFF in the power circuit 500, and the AC voltages and DC voltages supplied to the various circuits and components in the copying machine are terminated.

The system control MPU 100 comprises CPU 101 for controlling all systems of the copying machine 1 excluding the optical unit, ROM 102 for storing the systems programs executed by the CPU 101 as well as the data necessary to execute said systems programs, RAM 103 used as the working area of the CPU 101 as well as for storing the various parameters necessary to execute the aforesaid systems programs, timer circuit 104 provided with three timers which output timer interrupt request signals TIS1, TIS2 and TIS3 periodically over the time interval from the time CPU 101 is reset until the timer period has elapsed and is also provided with a delay counter that outputs a delay counter interrupt request signal TISD a predetermined time after the timer period has elapsed, input/output (I/O) port switching circuit 105 that is connected to key matrix 201 in the operation panel 200 and the display matrix 202 via the I/O port circuits P1 through P4, transmission buffer memory 106 for temporarily storing the data transmitted to the ADF control MPU 320, receiving buffer memory 107 for temporarily storing the data received from the ADF control MPU 320, data buffer memory 108 for temporarily storing the data transmitted to the optical unit control MPU 400 and the data received from the MPU 400, the aforesaid single input port circuit P1 and three output port circuits P2, P3 and P4. The aforementioned CPU 101, ROM 102, RAM 103, timer circuit 104, I/O port switching circuit 105, transmission buffer memory 106, receiving buffer memory 107, and data buffer memory 108 are connected via an 8-bit data bus 109 and via an address bus (not shown in the drawing).

The RAM 103 is connected to a backup battery Ba to maintain the data stored in said RAM 103 even when the main switch MSW is turned OFF. The RAM 103 is provided a transmission ring buffer TRB1 as a memory area to temporarily store the data transmitted from the MPU 100 to the MPU 320, and a transmission ring buffer TRB2 as a memory area to temporarily store data transmitted from the MPU 100 to the MPU 400. The RAM 103 is also provided a reception ring buffer RRB1 as a memory area for temporarily storing the data received from the MPU 320 by the MPU 100, and a reception ring buffer RRB2 as a memory area for temporarily storing the data received from the MPU 400 by the MPU 100.

The cassette detecting switches 120a, 120b and 120c provided near the paper cassettes 42a, 42b and 42c, respectively, detect whether or not said cassettes 42a, 42b and 42c are installed, and the cassette detection signals PCMS1, PCMS2 and PCMS3 expressing the results of said detection are output to the CPU 101 as interrupt request signals. The paper size detection switches 121a, 121b, 121c provided near the cassettes 42a, 42b and 42c, respectively, detect the size of the copy sheets accommodated in said cassettes 42a, 42b and 42c, and the paper size detection signals PCSS1, PCSS2 and PCSS3 expressing the results of said detection are output to the CPU 101 as interrupt request signals. The paper size detectors OD1 and OD2 provided optionally in the ADF 300 and below the document platen 11 in the copying machine 1 detect the size of the original document, and the original document size detection signals ODS expressing the results of said detection are output to the CPU 101 as interrupt request signals.

The 8-bit input pin of the I/O port switching circuit 105 is connected to the key matrix 201 via the I/O port circuit P1 and the signal bus 204. The 8-bit first output pin of the of the I/O switching circuit 105 is connected to the key matrix 201 and the display matrix 202 via the output port circuit P2 and the control bus 203. The 8-bit second output pin of the I/O switching circuit 105 is connected to the display matrix 202 via the output port circuit P3 and signal bus 205. The 8-bit third output pin of the I/O switching circuit 105 is connected to the display matrix 202 via the output port circuit P4 and signal bus 206.

The communication control portion for controlling data transfers between the MPU 100 and the MPU 320 comprises a clock generating circuit 330, transmission control circuit 331, serial register 332, reception control circuit 333, and serial register 334. The clock generating circuit 330 outputs clock signals of a predetermined frequency to the transmission control circuit 331 and the reception control circuit 333. The transmission control circuit 331 controls the reception process for the data received in the serial register 332 based on the input clock signals, and the reception control circuit 333 controls the reception process for the data received in the serial register 334 based on the input clock signals.

The data transmitted from the MPU 100 to the MPU 320 are temporarily stored in the transmission ring buffer TRB1 in RAM 103 in the main routine of the CPU 101 described later, and thereafter is transferred to the transmission buffer memory 106 in the interrupt process of the CPU 101. Then, after the 8-bit parallel data from the transmission buffer memory 106 are input to the serial register 332, said data are converted to serial data and sent to the MPU 320. The reception data received by the MPU 100 from the MPU 320 are input from the MPU 320 to the serial register 334 as serial data, and thereafter converted to 8-bit parallel data and transmitted to the receiving buffer memory 107. When the data occupy all the memory area of the receiving buffer memory 107, said buffer memory 107 outputs the serial reception interrupt request signal INTSR to the CPU 101, whereupon the CPU 101 transfers the reception data stored in the buffer memory 107 to the reception ring buffer RRB in RAM 103 for temporary storage via data bus 109 in an interrupt process described later. When a data error occurs in the data received from the MPU 320 into the serial register 334, the reception control circuit 333 outputs an error signal ERROR as an interrupt request signal to the CPU 101.

The communication control portion for controlling data transfers between the MPU 100 and the MPU 400 comprises a clock generating circuit 401, transmission control circuit 411, serial register 412, reception control circuit 413, and serial register 414. The clock generating circuit 410 outputs clock signals of a predetermined frequency to the transmission control circuit 411 and the reception control circuit 413. The transmission control circuit 411 controls the reception process for the data received in the serial register 412 based on the input clock signals, and the reception control circuit 411 controls the reception process for the data received in the serial register 414 based on the input clock signals.

The data transmitted from the MPU 100 to the MPU 400 are temporarily stored in the transmission ring buffer TRB2 in RAM 103 in the main routine of the CPU 101, and thereafter is transferred from the aforesaid reception ring buffer 2 to the data buffer memory 108 in the interrupt process of the CPU 101. Then, after the 8-bit parallel data from the data buffer memory 108 are input to the serial register 412, said data are converted to serial data and sent to the MPU 400. The reception data received by the MPU 100 from the MPU 400 are input from the MPU 400 to the serial register 414 as serial data. When the reception of the data in the serial register 414 is completed, the reception control circuit 413 outputs a serial reception interrupt request signal RXRDY to the CPU 101, and thereafter the serial data are converted to 8-bit parallel data and transmitted to the data buffer memory 108. The CPU 101 transfers the reception data stored in the data buffer memory 108 to the reception ring buffer RRB2 in RAM 103 for storage therein in the interrupt process. When a data error occurs in the data received in the serial register 414, the reception control circuit 413 outputs an error signal RXERR as an interrupt request signal to the CPU 101.

(d) Copying Machine Operation

Figure 4:
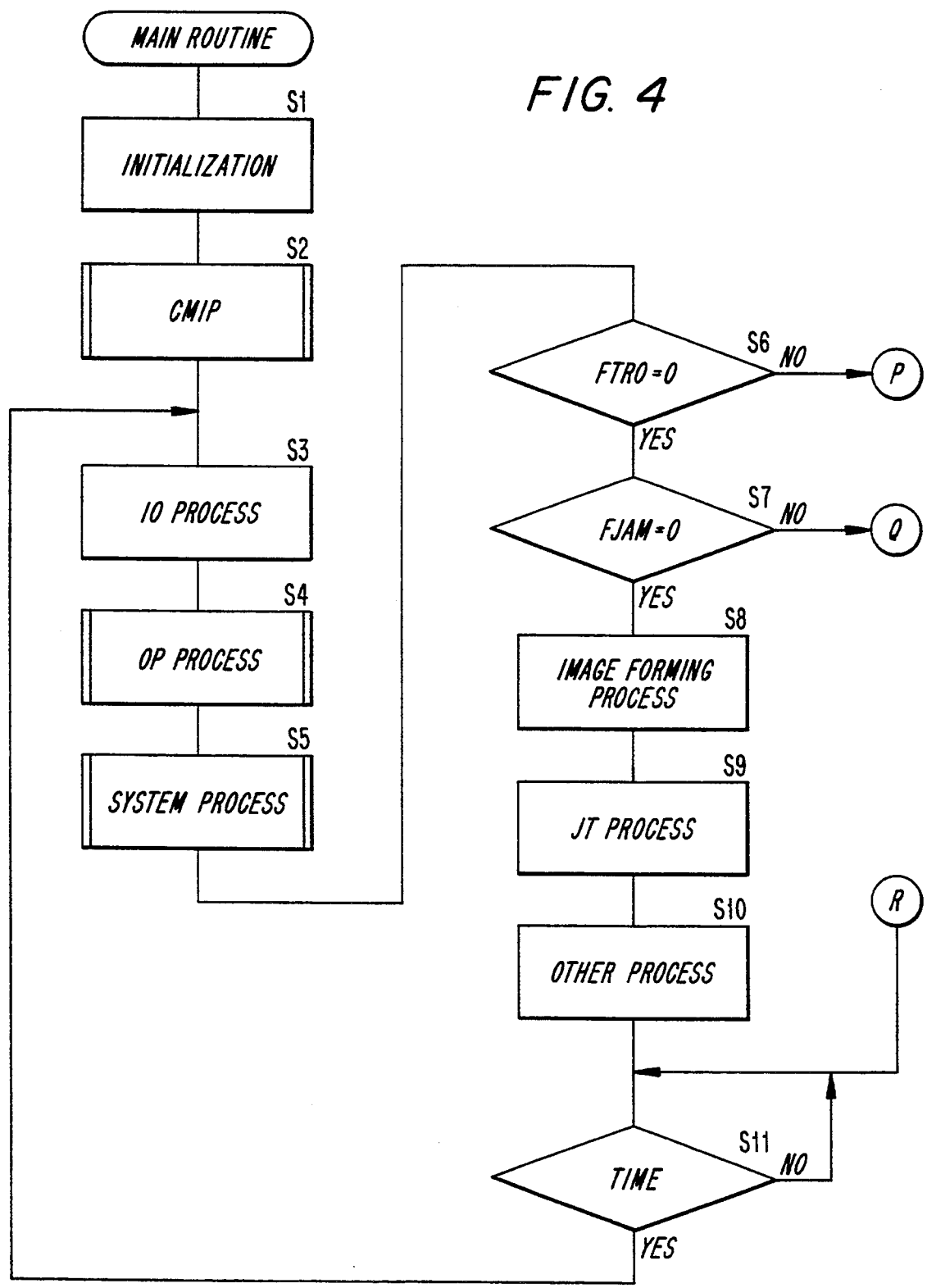
FIGS. 4 and 5 are flow charts of the main routines executed by the system controlling MPU of the copying machine.
Figure 6:
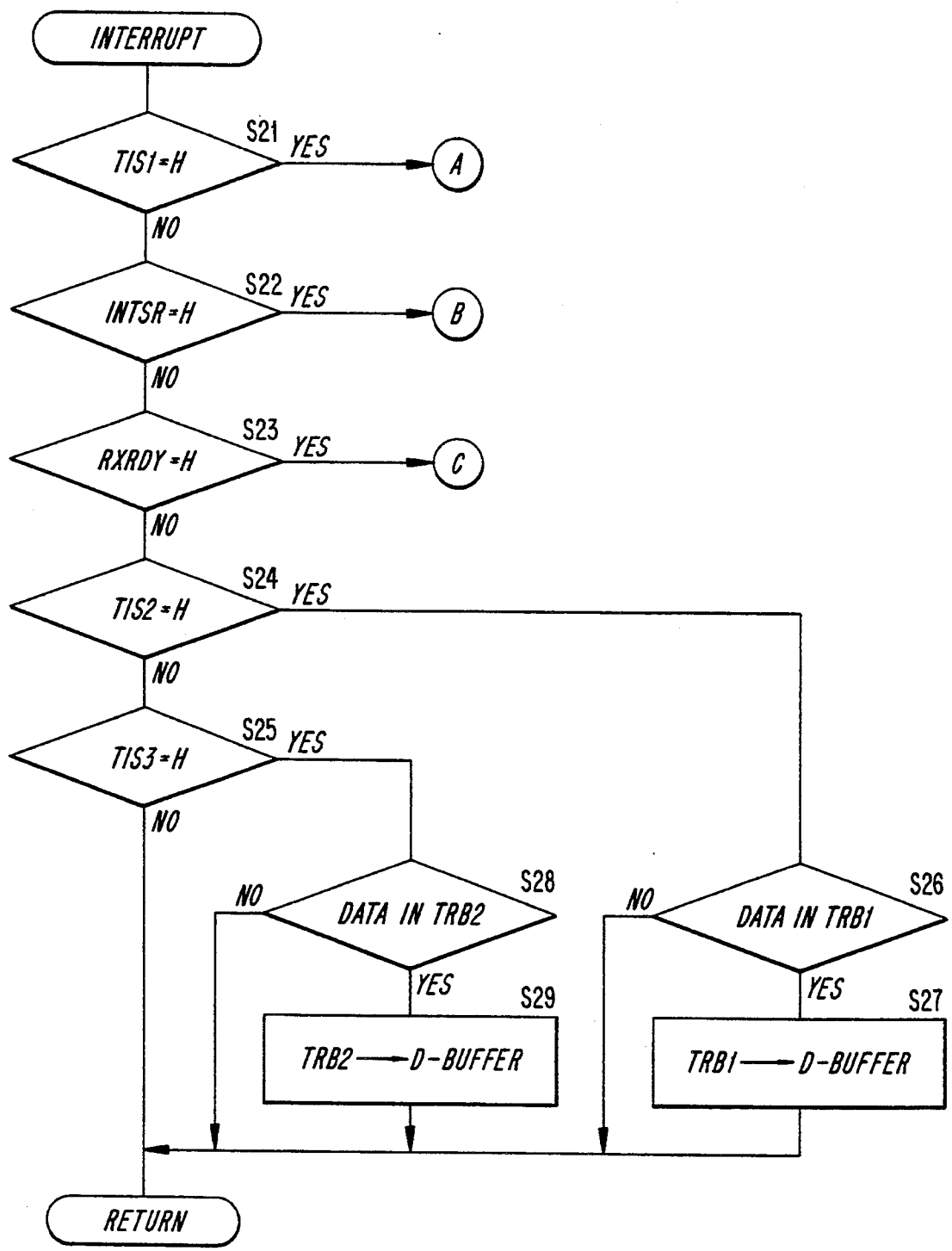
FIGS. 6, 7 and 8 are flow charts showing the interrupt processes executed by the system controlling MPU of the copying machine.
Figure 7:
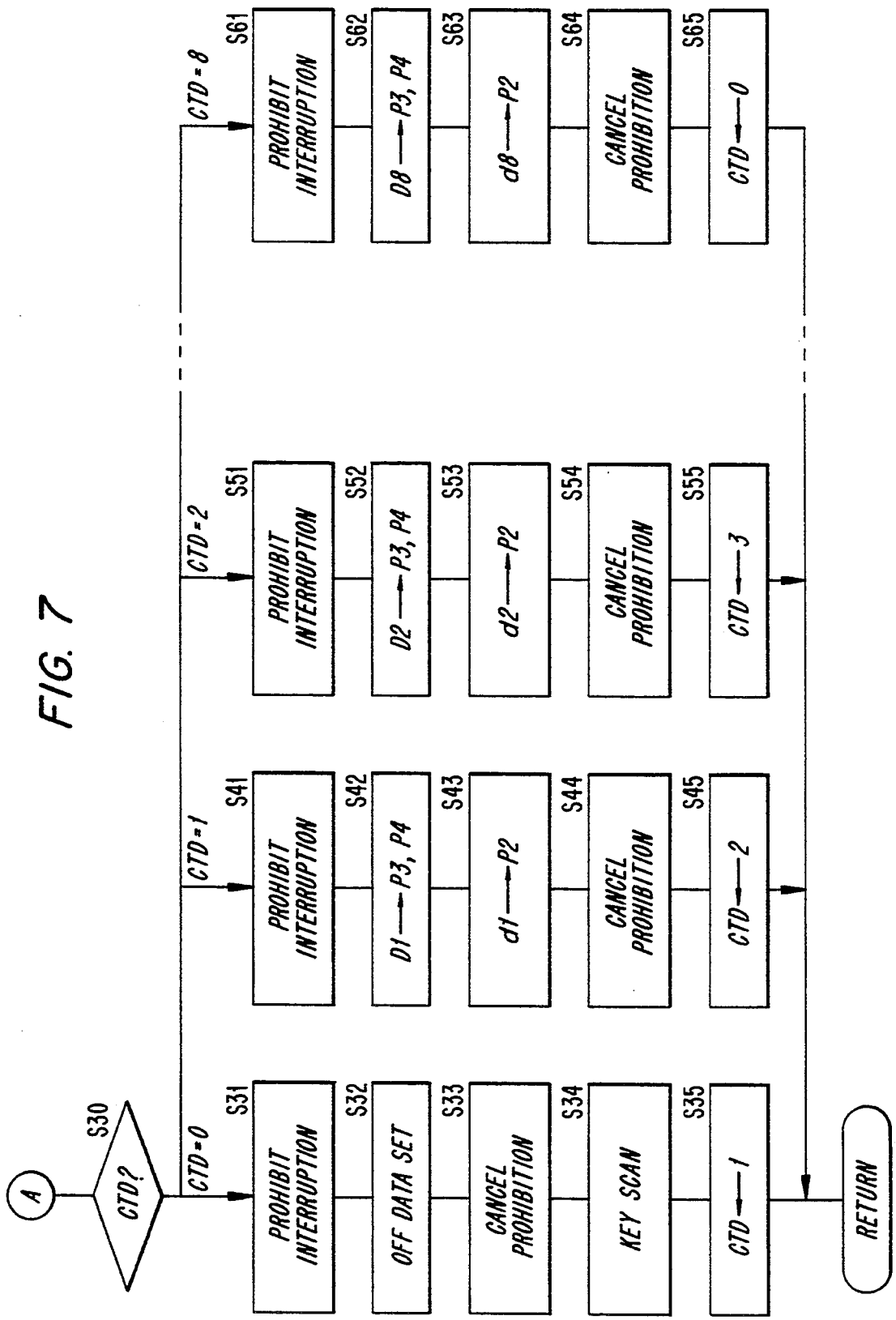
Figure 8:
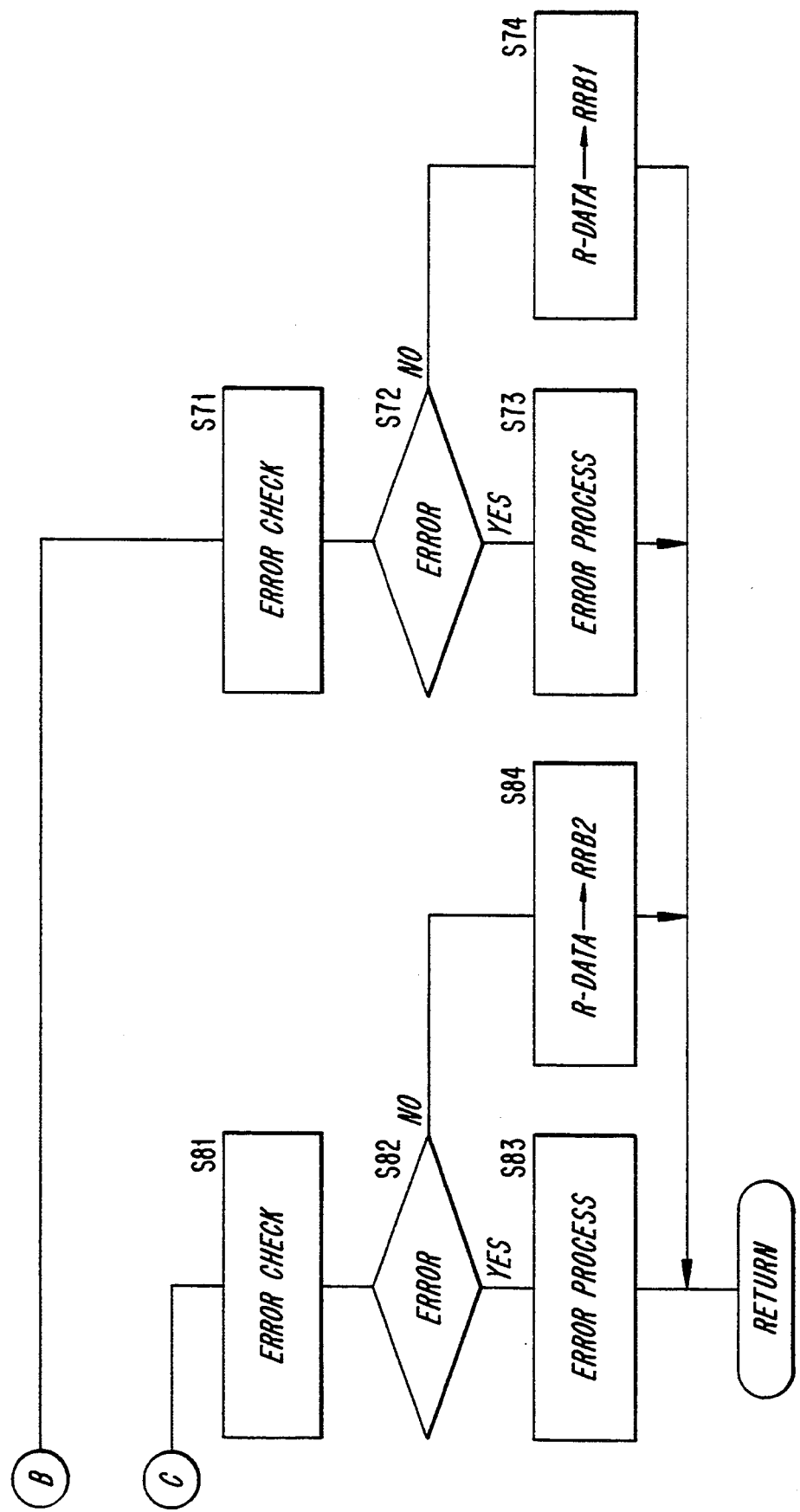

FIG. 4 is a flow chart showing the main routine executed by the CPU 101 in the system control MPU 100. When the CPU 101 is executing the aforesaid main routine, at least one of the interrupt request signals have been input, such that the interrupt routine shown in FIGS. 6 through 8 is executed.

When the main switch MSW is turned ON, the power circuit 500 outputs a power ON signal to the CPU 101. The CPU 101 is accordingly reset by the aforesaid power ON signal and starts execution of the main routine shown in FIG. 4.

Figure 9:
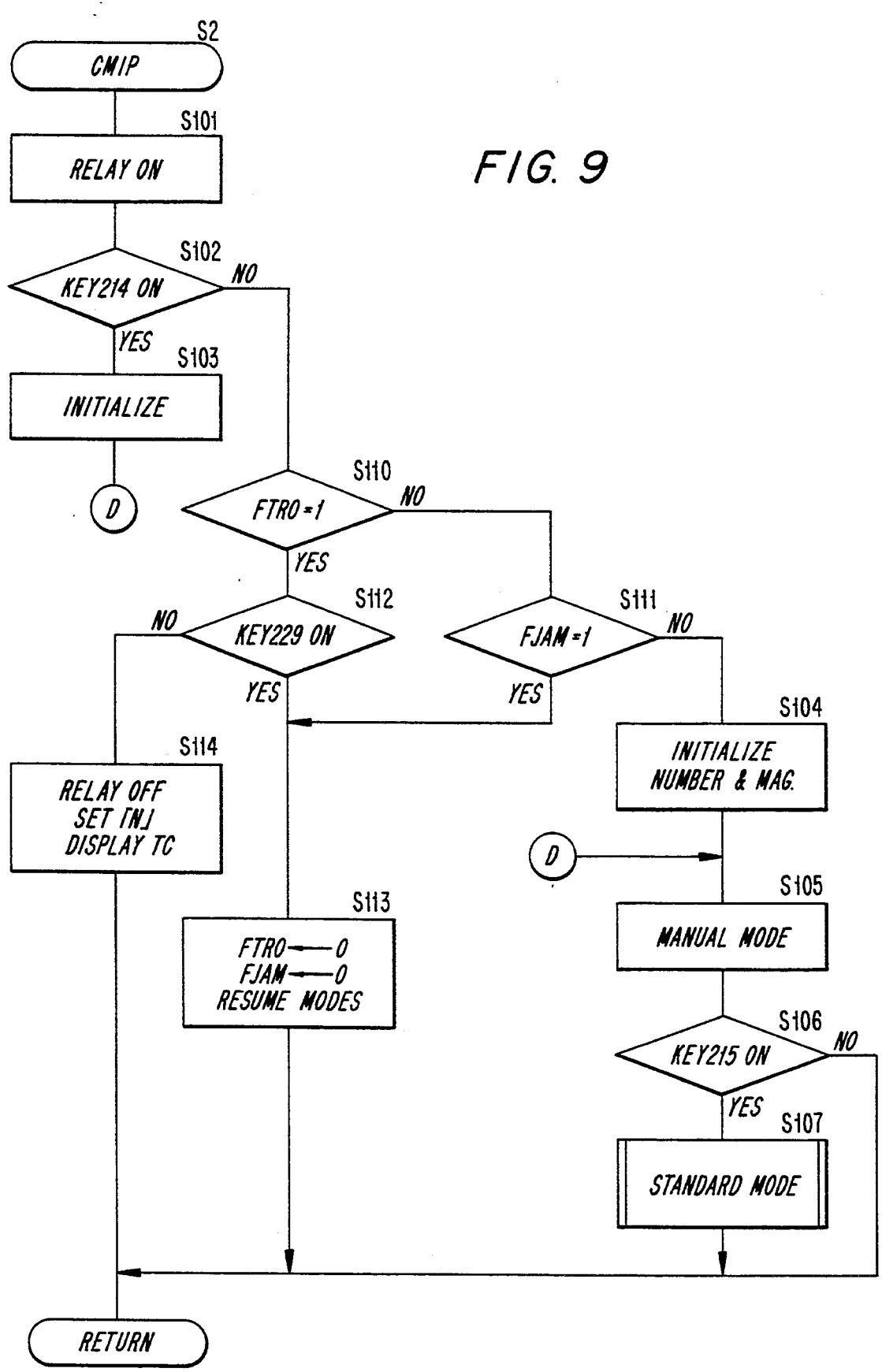
FIG. 9 is a flow chart showing the copying machine initialization process subroutine of FIG. 4.

In step S1, as shown in FIG. 4, the CPU 101 is initialized to reset the CPU 101 handling parameters and flags at [0] and thereafter, in step S2, the copy mode initialization process (CMIP) is executed (FIG. 9). The process for switching ON the main relay in the power circuit 500, process for canceling the trouble mode when the trouble mode reset key 229 is turned ON, process for initializing the copy settings such as copy number, copy magnification and the like, process for setting the standard mode executed when the standard mode set key 215 is turned ON, and like processes are executed in the copy mode initialization process (CMIP).

Then, in step S3, various signals are output in accordance with the processed contents of each subroutine described later, and the signal I/O process is executed to process the various signals input to the MPU 100. Thereafter, the input process for the key matrix 201 of operation panel 200 and the operation panel (OP) process (FIG. 11) containing the display preparation process of the display matrix 202 are executed in step S4. In step S5, the system control process is executed for controlling all systems of the entire copying machine including the copying machine main unit 1 and the optionally installed ADF 300 (FIG. 12). Thereafter, in step S6, the a check is made to determine whether or not the trouble mode flag FTRO, which is set at [1] when the trouble mode is set in step 9 described later, is set at [0]. Then, in step S7, a check is made to determine whether or not the jam mode flag FJAM, which is set at [1] when the jam mode is set in step S9 described later, is set at [0].

When neither the trouble mode nor jam mode are set in steps S6 and S7, i.e., when the flag FTRO is set at [0] (step S6, YES) and the flag FJAM is set at [0] (step S7, YES), then the image forming process is executed in step S8 to reproduce the original document image in the copy sheet fed from a cassette using the optical unit and apparatus of the copying machine main unit 1. Thereafter, a check made in step S9 to detect whether or not a paper jam or malfunction has occurred. If a paper jam has occurred, the jam mode is set and the flag FJAM is set at [1], and a non-zero code number expressing the paper jam contents is set in the parameter CDJAM, whereas if a paper jam has not occurred, the flag FJAM is reset at [0] and the aforesaid parameter CDJAM is set at [0]. If a trouble condition has occurred, the flag FTRO is set at [1] to set the trouble mode and a non-zero code number expressing the trouble condition is set in the parameter CDTRO, whereas if a trouble condition has not occurred, the flag FTRO is reset at [0] and the aforesaid parameter CDTRO is set at [0].

After the other main routine processing has been executed in step S10, a check is made in step S11 to determine whether or not a predetermined timer interval has elapsed since the start of processing in step S3. When the determination is NO in step S11, loop processing is repeated until the aforesaid predetermined time interval has elapsed. When said timer interval has elapsed and the reply to the query in step S11 is YES, the routine returns to step S3 and the processing of steps S3 through S10 is repeated.

Figure 5:
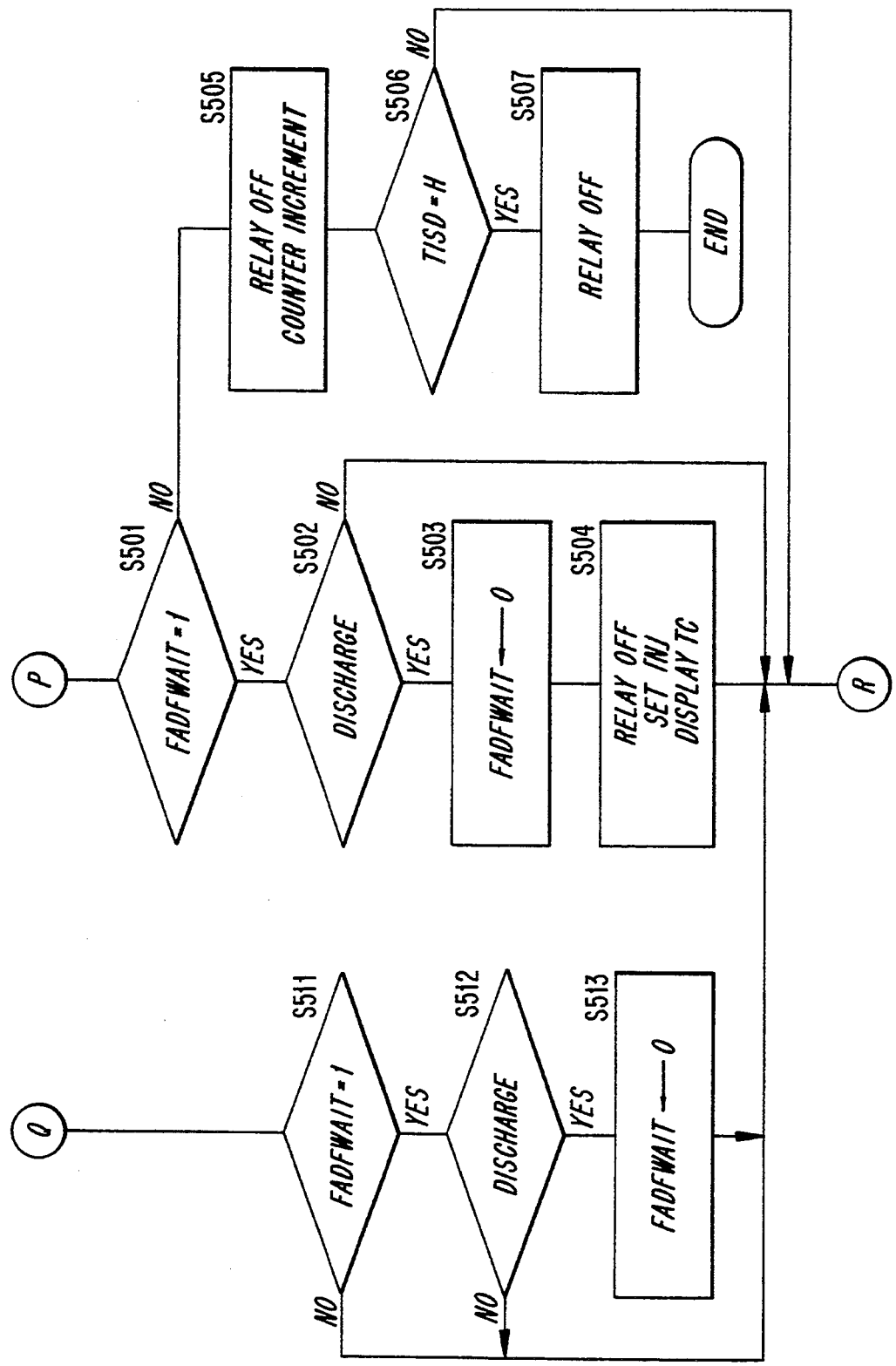

When the trouble mode is set in step S6 and the flag FTRO is set at [1] (step S6, NO), the routine continues to step S501 of FIG. 5 and a check is made to determine whether or not the flag FADFWAIT is set at [1], i.e., whether or not the ADF 300 is currently operating. When the ADF 300 is currently operating (step S501, YES), a check is made in step S502 to determine whether or not the discharge of all of the original documents from the document tray 303 of the ADF 300 has been completed based on the data transmitted from the MPU 320. When all documents have been completely discharged (step S502, YES), the flag FADFWAIT is reset at [0] in step S503, the main relay is switched OFF in power circuit 500 in step S504, a specified numerical value (N) is set in the delay counter in timer circuit 104 and the trouble code TC is displayed, whereupon the program continues to step S11 in FIG. 4. On the other hand, when the discharge of all documents is not complete in step S502 (step S502, NO), the program continues as is to step S11 in FIG. 4.

When the ADF 300 is not operating in the aforesaid step S501 (step S501, NO), the program continues to step S505 where the main relay is turned OFF in power circuit 500 and the delay counter in the timer circuit 104 is incremented, and the program continues to step S506. In step S506, a check is made to determine whether or not the enumeration of the aforesaid delay counter has been completed, i.e., whether or not the interrupt request signal TISD output from the delay timer is a high level (H) signal. When the interrupt request signal TISD is high level (H), the main relay is turned OFF to put the operation status of the copying machine unit 1 in the standby state, and when the main switch MSW is again switched ON the main routine is executed as shown in FIG. 4. When the interrupt request signal TISD is a low level (L) signal in step S506 (step S506, NO), the program continues as is to step S11 of FIG. 4.

When the jam mode is set in step S7, i.e., when the flag FJAM is set at [1] (step S7, NO), a check is made in step S511 to determine whether or not the ADF 300 is currently operating. When the ADF 300 is found to be currently operating (step S511, YES), a check is made in step S512 to determine whether or not the discharge of all original documents from the document tray 303 of the ADF 300 has been completed. If the document discharge operation has been completed (step S512, YES), the flag FADFWAIT is set at [0] in step S513, and then the program returns to step S11 of FIG. 4.

When the ADF 300 is not currently operating in step S511 (step S511, NO), or when all original documents are not yet discharged from the document tray 303 in step S512 (step S512, NO), the program returns as is to step S11 of FIG. 4.

FIG. 6 is a flow chart showing the interrupt process executed when at least a single interrupt request signal is input to the CPU 101 while the previously described main routine is being executed. In this interrupt process the display process for dynamic lighting of the display matrix 202 is given priority so as to maintain constant periodicity relative to the lighting of said display matrix 202. In the present embodiment, a receiving buffer memory 107 and a data buffer memory 108 are provided to store the data received from the optical unit control MPU 400 and the ADF control MPU 320 during the display process. Furthermore, the transmission process for transmitting data to the optical unit control MPU 400 and the ADF control MPU 320 is executed when the second and third interrupt request signals TIS2 and TIS3 are output with predetermined periodicity from two individual interrupt timers within the timer circuit 104, said process being described in detail later.

As shown in FIG. 6, a check is made in step S21 to determine whether or not a high (H) level first timer interrupt signal TIS1 has been sent to the CPU 101 from the first timer in the timer circuit 104, and a check is made in step S22 to determine whether or not a high (H) level serial reception interrupt request signal INTSR has been sent to the CPU 101 from the receiving buffer memory 107, then a check is made in step S23 to determine whether or not a high (H) level serial reception interrupt request signal RXRDY has been sent to the CPU 101 from the reception control circuit 413. Subsequently, in step S24, a determination is made as to whether or not the a high (H) level second timer interrupt request signal TIS2 has been sent to the CPU 101 from the second timer in the timer circuit 104, and a check is made in step S25 to determine whether or not a high (H) level third timer interrupt request signal TIS3 has been sent to the CPU 101 from the third timer in the timer circuit 104. When any of the aforesaid interrupt request signals in steps S21 through S25 are low (L) level signals, the program returns.

When a high (H) level first timer interrupt signal TIS1 is sent to the CPU 101 from the first timer in the timer circuit 104 in step S21 (step S21, YES), the program continues to step S30 of FIG. 7, and the control flow branches as described below based on the parameter CTD. The parameter CTD is reset at [0] in the CPU initialization process in step S1. When the parameter CTD is 0, 1, 2, ... 9, the control flow branches to steps S31, S41, S51, ... S61, respectively.

In the processing of steps S31 through S61 of FIG. 7, the key scan process of the key matrix 201 of operation panel 200 and the dynamic lighting display process of display matrix 202 are executed.

Interrupt to the CPU 101 (multiple interrupts) are prohibited in step S31. The CPU 101 is provided an internal interrupt request signal latching means. When a further interrupt request signal is sent to the CPU 101 while an interrupt is prohibited, the CPU 101 latches said further interrupt request signal via the aforesaid latching means and the multiple interrupt request are stored in memory, although the interrupt process (multiple interrupt) relating to the aforesaid interrupt request signal is not executed. Thus, the periodicity of the dynamic lighting of the display matrix 202 is not affected by the aforesaid prohibit interruption process. Whereas the start of operation of the interrupt process requested by the aforesaid other interrupt signal is delayed due to the prohibition of an interrupt process via further interrupt signals, a one-stage receiving buffer memory 107 and a one-stage data buffer memory 108 are provided to prevent operational error when receiving data from the MPU 320 or MPU 400 due to the aforesaid delay. Then, after the OFF data has been set to the display matrix 202 in step S32, the CPU 101 interrupt prohibition is canceled in step S33. When the interrupt prohibition is canceled, the CPU 101 executes the interrupt process (multiple interrupt) relative to the subsequent interrupt request signal which has been stored in memory by the interrupt request signal latching means. Then, the key scan process for the key matrix 201 is executed in step S34. In the key scan process, the CPU 101 transmits key scan signals for the key matrix 201 through the I/O switching circuit 105, output port circuit P2 and control bus 203, whereupon, in response to said key scan signals, the ON key data of key matrix 201 are output to the CPU 101 through the signal bus 204, input port circuit P1 and I/O switching circuit 105. After the key scan process has been completed, the parameter CTD is set at [1] in step S35, and the program returns.

In step S41, interruption of the CPU 101 is prohibited, and in step S42 the data D1 relative to the first column of the display matrix 202 are transferred to the display matrix 202 via the output ports P3 and P4 and signal bus 205. Thereafter, in step S43, the data dl to light the display and/or LED of the first column of display matrix 202 are transferred to the display matrix 202 via output port P2 and control bus 203. The display and/or LED of the first column of the display matrix 201 is thereby dynamically lighted. Then, in step S44, the CPU 101 interrupt prohibition is canceled, and in step S45 the parameter CTD is set at [2] and the program returns.

In step S51, interruption of the CPU 101 is prohibited, and in step S52 the data D2 relative to the second column of the display matrix 202 are transferred to the display matrix 202 via the output ports P3 and P4 and signal bus 205. Thereafter, in step S53, the data d2 to light the display and/or LED of the second column of display matrix 202 are transferred to the display matrix 202 via output port P2 and control bus 203. The display and/or LED of the second column of the display matrix 201 is thereby dynamically lighted. Then, in step S54, the CPU 101 interrupt prohibition is canceled, and in step S55 the parameter CTD is set at [3] and the program returns.

Dynamic lighting of the display and/or LED of the third through seventh columns of display matrix 202 are executed in the same manner.

Furthermore, in step S61, interruption of the CPU 101 is prohibited, and in step S62 the data D8 relative to the eighth column of the display matrix 202 are transferred to the display matrix 202 via the output ports P3 and P4 and signal buses 205 and 206. Thereafter, in step S63, the data d8 to light the display and/or LED of the eighth column of display matrix 202 are transferred to the display matrix 202 via output port P2 and control bus 203. The display and/or LED of the eighth column of the display matrix 201 is thereby dynamically lighted. Then, in step S64, the CPU 101 interrupt prohibition is canceled, and in step S65 the parameter CTD is set at [0] and the program returns.

Referring to step S22 of FIG. 6, when a high (H) level serial interrupt signal INTSR is sent from the receiving buffer memory 107 to the CPU 101 (step S22, YES), the program continues to step S71 of FIG. 8 where an error checking process is executed for the data stored in the receiving buffer memory 107, and a further determination is made in step S72 as to whether or not the error checking process has discovered an error. If an error is discovered (step S72, YES), a predetermined error process is executed in step S73 relative to said discovered error, after which the program returns. If an error is not discovered, on the other hand (step S72, NO), the data received from the MPU 320 is transferred from the receiving buffer memory 107 through the data bus 109 and is temporarily stored in the receiving ring buffer RRB1 in RAM 103 in step S74, and the program returns.

Referring to step S23 of FIG. 6, when a high (H) level serial reception interrupt signal RXDY is sent from the receiving buffer 107 to the CPU 101 (step S23, YES), the program continues to step S81 of FIG. 8 where an error checking process is executed for the data stored in the data buffer memory 108, and a further determination is made in step 882 as to whether or not the error checking process has discovered an error. If an error is discovered (step S82, YES), a predetermined error process is executed in step S83 relative to said discovered error, after which the program returns. If an error is not discovered, on the other hand (step S82, NO), the data received from the MPU 400 is transferred from the data buffer memory 108 through the data bus 109 and is temporarily stored in the receiving ring buffer RRB2 in RAM 103 in step S84, and the program returns.

Referring to step S24 of FIG. 6, when a high (H) level second timer interrupt request signal TIS2 is sent from the second timer in the timer circuit 104 to the CPU 101 (step S24, YES), the program continues to step S26 where a check is made to determine whether or not transmission data are stored in the transmission ring buffer TRB1 of RAM 103. If transmission data are stored in the transmission ring buffer TRB1 (step S26, YES), the program continues to step S27 where data stored in said transmission ring buffer TRB1 are transferred to the transmission buffer memory 106, and subsequently transmitted through the serial register 332 to the MPU 320. If data are not stored in the transmission ring buffer TRB1, on the other hand (step S26, NO), the program returns.

Thereafter, in step S25, when a high (H) level third timer interrupt request signal TIS3 is sent from the third timer in the timer circuit 104 to the CPU 101 (step S25, YES), the program continues to step S28 where a check is made to determine whether or not transmission data are stored in the transmission ring buffer TRB2 of RAM 103. If transmission data are stored in the transmission ring buffer TRB2 (step S28, YES), the program continues to step S29 where data stored in said transmission ring buffer TRB2 are transferred to the data buffer memory 108, and subsequently transmitted through the serial register 412 to the MPU 400. If data are not stored in the transmission ring buffer TRB2, on the other hand (step S28, NO), the program returns.

As previously described, all other interrupt processes (multiple interrupts) are prohibited while the interrupt process initiated by the interrupt request signal TIS1 is being executed, i.e., while the dynamic lighting process for the display matrix 201 is being executed. However, further interrupt processing (multiple interrupts) is not prohibited during the ongoing execution of interrupt processes initiated by other interrupt request signals INSTR, TXRDY, TES2, and TES3. That is, the dynamic display process is executable by interrupting the other interrupt processes even as said other interrupt processes are currently being executed.

FIG. 9 is a flow chart showing the copy set initialization process (step S2) subroutine of FIG. 4.

As shown in FIG. 9, the main relay is switched ON in the power circuit 500 in step S101, and a check is made in step S102 to determine whether or not the copy set initialization key 214 of operation panel 200 is switched ON. If the copy set initialization key 214 is ON, (step S102, YES), then all copy settings are initialized at predetermined settings in step S103, and the program continues to step S105. After the operation mode has been set in the manual mode in step S105, a check is made in step S106 to determine whether or not the standard mode set key 215 of operation panel 200 has been switched ON. If the standard mode set key 215 is switched ON (step S106, YES), then the standard mode set process is executed in step S107 (refer to FIG. 10), and the program returns. On the other hand, if the standard mode set key 215 is not ON in step 106 (step S106, NO), the program returns.

When the copy set initialization key 214 is not found to be ON in step S102 (step S102, NO), a check is then made in step S110 to determine whether or not the trouble mode is set, i.e., whether or not the flag FTRO is set at [1]. If the flag FTRO is set at [1] (step S110, YES) the program continues to step S112, whereas if the flag FTRO is set at [0] (step S110, NO), a check is made in step S111 to determine whether or not the jam mode is set, i.e., whether or not the flag FJAM is set at [1]. If the flag FJAM is set at [1] (step S111, YES) the program continues to step S113, whereas if the jam mode is not set and the flag FJAM is reset at [0] (step S111, NO), then the copy number and copy magnification are initialized at predetermined settings in step S104, and the program continues to step S105.

When the trouble reset key 229 is checked in step S112 to determine whether or not said reset key 229 is switched ON and is discovered to be in the ON state (step S112, YES), the program continues to step S113. Since the JAM mode and trouble mode have been canceled, the flag FTRO and flag FJAM are reset to [0] and the copy mode set prior to the jam or trouble is resumed, and the program returns. On the other hand, if the trouble reset key 229 is not switched ON (step S112, NO), then in step S114 the main relay in the power circuit 500 is turned OFF, a predetermined initial value N is set in the delay counter in the timer circuit 104, and the data is set to display the trouble code TC on the display 255, then the program returns. The aforesaid trouble code is dynamically lighted on the display 255 in the interrupt process of FIG. 7.

FIG. 10 is a flow chart showing the standard mode set process (step S107) subroutine in FIG. 9.

As shown in FIG. 10, a check is made in step S301 to determine whether or not the optional ADF 300 is installed. If the ADF 300 is installed (step S301, YES), the program continues to step S303, whereas if the ADF 300 is not installed (step S301, NO), a check is made in step S302 to determine whether or not the document size detecting devices OD1 and OD2 are installed. If the document size detecting devices OD1 and OD2 are installed (step S302, YES), the program continues to step S303, whereas if the document size detecting devices OD1 and OD2 are not installed (step S302, NO), the program continues to step S307 where the manual mode is set as the operating mode, then the program returns.

When the check is made in step S303 to determine whether or not two or more cassettes are installed and it is determined that two or more cassettes are installed (step S303, YES), a further check is then made in step S304 to determine whether or not the installed cassettes are the same size. If all the installed cassettes are not the same size (step S304, NO), the APS mode is set as the operating mode in step S305, then the program returns.

When it is determined in step S303 that two or more cassettes are not installed (step S303, NO), or when it is found in step S304 that all the installed cassettes are the same size (step S304, TES), the program continues to step S306 and the AMS mode is set as the operating mode. Then the program returns.

Figure 11:
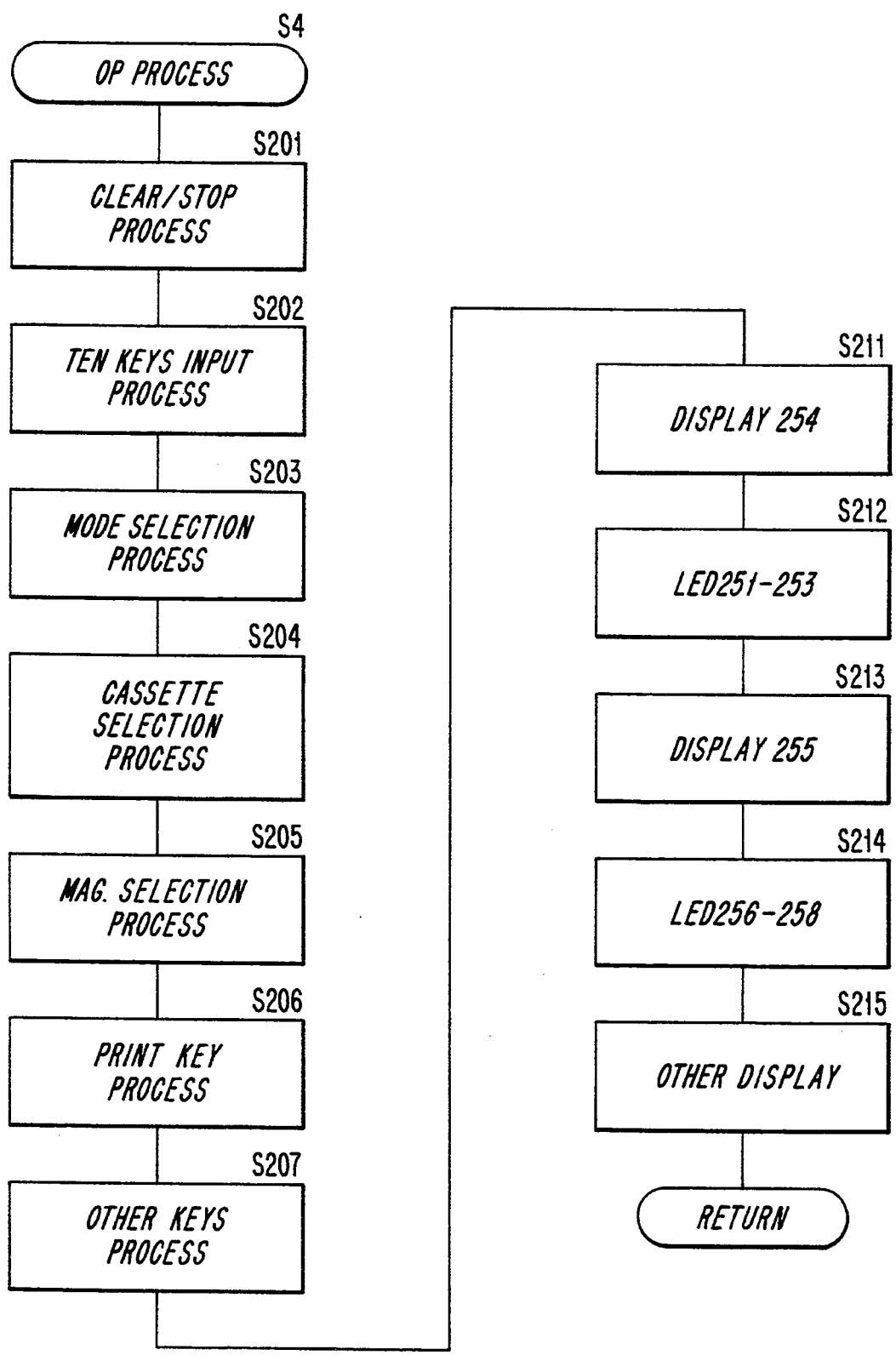
FIG. 11 is a flow chart showing the operation panel process subroutine of FIG. 4.
Figure 12:
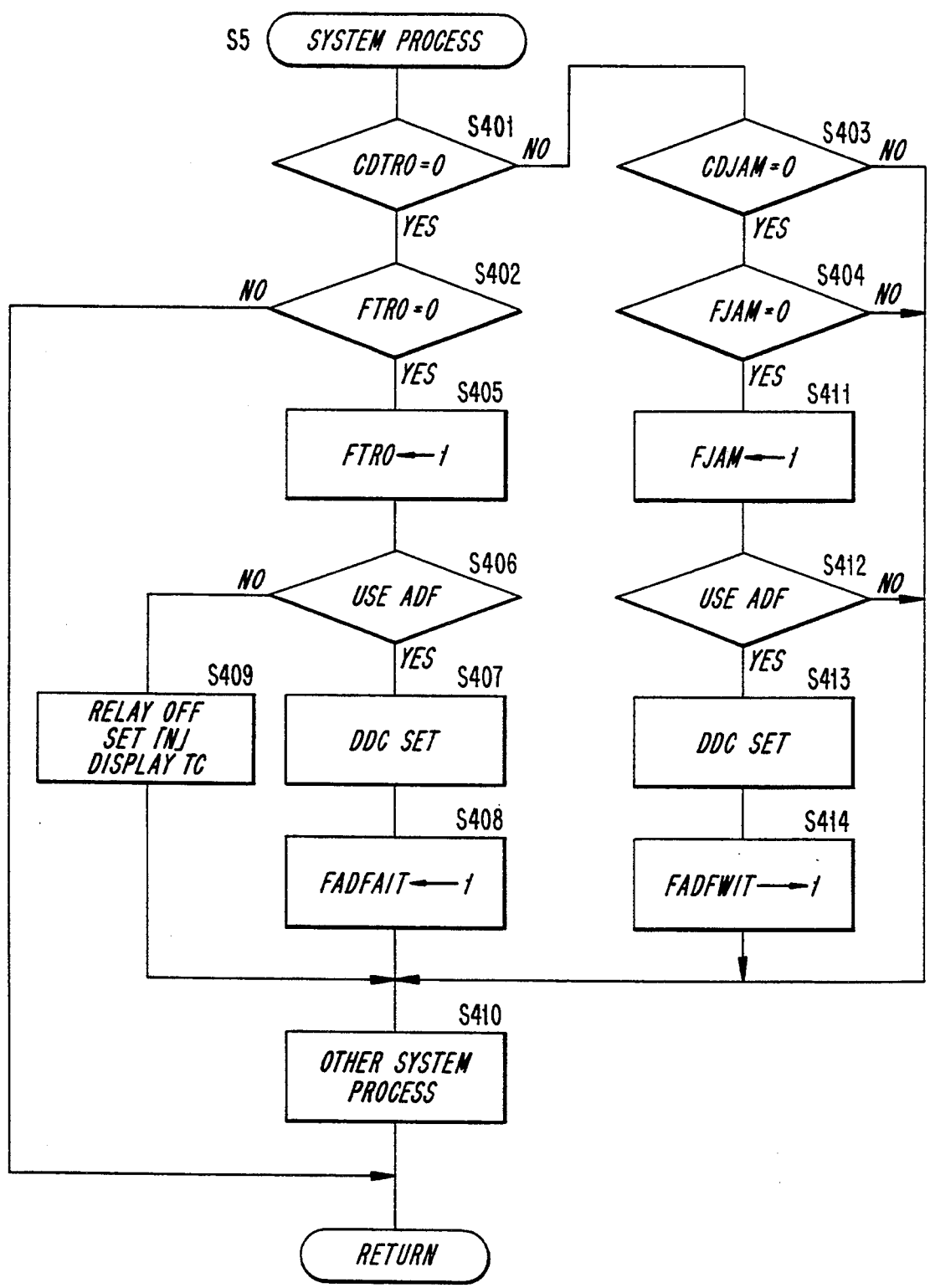
FIG. 12 is a flow chart showing the system control process subroutine of FIG. 4.

FIG. 11 is a flow chart showing the operation panel (OP) process subroutine of FIG. 4. The OP process executes the input process for the various keys of the key matrix 201 of the operation panel 200, i.e., the predetermined process based on the key ON status information after the data for the keys switched ON in the key scan process executed in the interrupt process are fetched from the RAM 103 (hereinafter referred to as "input process"), and executes the lighting process for setting the lighting data in RAM 103 for dynamic lighting of the display and LED of the display matrix 202 in the interrupt process (hereinafter referred to simply as "lighting process").

As shown in FIG. 11, in step S201 the clear/stop key 217 input process is executed, ten-key 218 input process is executed in step S202, operation mode selection keys 211, 212, 213 input process is executed in step S203, cassette selection keys 219, 220 and 221 input process is executed in step S204, copy magnification selection keys 222 and 226 input process is executed in step S205, print start key 216 input process is executed in step S206, and other keys of the key matrix 202 input process are executed in step S207.

Thereafter, the lighting process for the copy number display 254 is executed in step S211, lighting process for the LEDs 251, 252 and 253 which indicate the operating mode selection is executed in step S212, lighting process for display 255 which indicates the copy magnification is executed in step S213, lighting process for the LEDs 256, 257 and 258 which indicate the cassette selection is executed in step S214, and the lighting process for other displays of the display matrix 202 are executed in step S215, then the program returns to the main routine.

FIG. 12 shows a flow chart of the system control process (step S5) subroutine of FIG. 4.

As shown in FIG. 12, a check is made in step S401 to determine whether or not the parameter CDTRO, which expresses the trouble code stored in RAM 103, is equal to [0]. If the parameter CDTRO does not equal [0] (step S401, YES), a further check is made in step S402 to determine whether or not the trouble mode is set. When the trouble mod is set and the flag FTRO is set at [1] (step S402, NO), the program returns to the main routine.

On the other hand, when the trouble mod is not set and the flag FTRO is set at [0] (step S402, YES), said flag FTRO is reset at [1] in step S405, and a check is made in step S406 to determine whether or not the ADF 300 is currently in use. When the ADF 300 is in use (step S406, YES), a document discharge command DDC is set and sent to the MPU 320 in step S407 to discharge the document placed on the document platen 11. Then, in step S408, the flag FADFWAIT is set at [1] to indicate the ADF 300 is currently operating, and the program continues to step S410. However, when the ADF 300 is not currently operating (step S406, NO), then in step S409, the main relay is switched OFF in power circuit 500, a predetermined initial value N is set in the delay counter of the timer circuit 104, and the data are set in RAM 103 to display the trouble code on the display 255, then the program continues to step S410.

A check is made in step S403 to determine whether or not the parameter CDJAM, which expresses the trouble code stored in RAM 103, is equal to [0]. If the parameter CDJAM does not equal [0] (step S403, YES), a further check is made in step S404 to determine whether or not the jam mode is set. When the jam mode is set and the flag FJAM is set at [1] (step S404, NO), the program continues to step S410.

On the other hand, when the jam mod is set and the flag FJAM is set at [0] (step S404, YES), the flag FJAM is set at [1] in step S411, then a further check is made in step S412 to determine whether or not the ADF 300 is currently in operation. When the ADF 300 is currently operating (step S412, YES), a document discharge command is set and sent to the MPU 320 in step S413 to discharge the document placed on the platen 11. Then, in step S414, the flag FADFWAIT is set at [1] to indicate the ADF 300 is currently operating, and the program continues to step S410. However, when the ADF 300 is not currently operating (step S412, NO), the program continues to step S410.

In step S410, the other system control processes are executed, e.g., transferring the transmission data to the transmission ring buffers 1 and 2 for communication between the MPUs 320 and 400. Thereafter, the program returns to the main routine.

What is claimed is:

1. An electronic device comprising:
a first operating means for executing a first task;
a second operating means for executing a second task;
display means for displaying an operating condition of said electronic device;
first control means for controlling said first operating means; and
second control means for controlling said second operating means and said display means, wherein said second control means has a first interrupt routine for operating said display means and a second interrupt routine for communicating between said first control means and said second control means, said first interrupt routine having a higher priority than that of said second interrupt routine.

2. The electronic device as claimed in claim 1, wherein said second control means has a main routine by which said second operating means is controlled.

3. The electronic device as claimed in claim 1, further comprising a first signal generating means for generating a first interrupt signal and a second signal generating means for generating a second signal interrupt signal, wherein said second control means initiates said first interrupt routine in response to said first interrupt signal and initiates said second interrupt routine in response to said second interrupt signal.

4. The electronic device as claimed in claim 3, wherein said second control means prohibits initiating said second interrupt routine when said second interrupt signal is generated during execution of said first interrupt routine.

5. The electronic device as claimed in claim 4, further comprising a memory means for temporarily storing data which should be transferred from said first control means to said second control means.

6. The electronic device as claimed in claim 5, wherein said second signal generating means generates said second interrupt signal when said memory means stores a predetermined amount of data received from said first control means.

7. The electronic device as claimed in claim 6, wherein said first signal generating means generates said first interrupt signal periodically at predetermined time intervals.

8. The electronic device as claimed in claim 1, wherein said first interrupt routine has a program for dynamic operation of said display means.

9. An electronic device comprising:
first operating means for executing a first task;
second operating means for executing a second task:
display means for displaying an operating condition of said electronic device;
first and second processors connected by a communication line:
memory means having a main program for controlling said first operating means and a first interrupt program for dynamic operation of said display means and a second interrupt program for executing data communication between said first and second processors, wherein said first processor controls said first operating means based on said main program and controls said display means based on said first interrupt program and communicates with said second processor based on said second interrupt program;
first means for making said first processor execute said main program;
second means for making said first processor interrupt said main program in order to execute said second interrupt program;
third means for making said first processor interrupt one of the main program and said second interrupt program, which is currently being executed, at regular predetermined intervals in order to execute said first interrupt program; and
fourth means for prohibiting said first processor from interrupting said first interrupt program being executed.

10. An electronic device comprising:
operating means for executing a predetermined task;
display means for displaying an operating condition of said electronic device;
memory means having a main program for controlling said operating means and a plurality of interrupt programs, one of which is a display program for dynamic operation of said display means, said display program having a higher priority than those of the interrupt programs other than the display program;
request means for requesting execution of one of said interrupt programs;
program executing means for executing said main program and said interrupt programs, wherein said program executing means interrupts a currently executing program and starts execution of a requested interrupt program in response to a request from the request means and resumes the program that was interrupted after completing the execution of the requested interrupt program; and
prohibiting means for prohibiting said program executing means from interrupting said display program when the request means requests execution of one of the interrupt programs other than the display program during execution of the display program.

11. The electronic device as claimed in claim 10, wherein said request means generates a first request signal for requesting said display program and a second request signal for requesting one of the interrupt programs other than the display program;
said program executing means interrupts the currently executing program and starts executing the display program when said first signal is generated;
said program executing means completes the execution of said display program and thereafter starts executing one of the other interrupt programs when said second request signal is generated during the execution of said display program.

12. The electronic device as claimed in claim 11, wherein said request means generates said first request signal periodically at predetermined intervals.

13. An image forming apparatus comprising:
first operating means for executing a first task;
second operating means for executing a second task;
display means for displaying an operating condition of said apparatus;
first and second processors connected by a communication line;
first memory means having a main program for controlling said first operating means and a first interrupt program for dynamic operation of said display means, and a second interrupt program for executing data communication between said first and second processors, wherein said first processor controls said first operating means based on said main program and communicates with said second processor based on said second interrupt program;
second memory means for temporarily storing data sent from said second processor to said first processor;
first signal generating means for generating a first interrupt signal at regular predetermined intervals;
second signal generating means for generating a second interrupt signal when said second memory stores a predetermined amount Of data;
means for operating said first processor so that said first processor interrupts said main program which is currently being executed and starts executing said second interrupt program when said second signal is generated during said main program, and interrupts one of said main program and said second program which is currently being executed and starts executing said first interrupt program when said first interrupt signal is generated; and
means for prohibiting said first processor from interrupting said first interrupt program when said second interrupt signal is generated during said first interrupt program.

* * * * *